United States Patent
Singh et al.

(10) Patent No.: US 12,501,168 B2
(45) Date of Patent: Dec. 16, 2025

(54) DEVICE AND METHOD FOR SURROUND VIEW CAMERA SYSTEM FOR VEHICLE AND TRAILER

(71) Applicant: Robert Bosch GmbH, Stuttgart (DE)

(72) Inventors: Vicky Ranveer Singh, Canton, MI (US); William John Hallendy, Chesterfield, MI (US); Vincent Quoc Le, Dearborn, MI (US); Connor Flis, Clinton Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/757,910

(22) Filed: Jun. 28, 2024

(65) Prior Publication Data

US 2025/0097582 A1     Mar. 20, 2025

Related U.S. Application Data

(63) Continuation-in-part of application No. 18/468,322, filed on Sep. 15, 2023.
(Continued)

(51) Int. Cl.
*H04N 23/698*    (2023.01)
*G06T 3/4038*    (2024.01)
(Continued)

(52) U.S. Cl.
CPC ......... *H04N 23/698* (2023.01); *G06T 3/4038* (2013.01); *G06T 7/20* (2013.01);
(Continued)

(58) Field of Classification Search
None
See application file for complete search history.

(56) References Cited

U.S. PATENT DOCUMENTS 6,172,601 B1   1/2001  Wada et al.
8,295,644 B2  10/2012  Shulman et al.
(Continued)

FOREIGN PATENT DOCUMENTS

JP    2002-373327 A   12/2002
WO    2023/028614 A1   3/2023

OTHER PUBLICATIONS

Morozov Automotive, Bird's Eye View Backup System With Just One Camera, ATOTO AC-HD03, Youtube, Aug. 30, 2020, https://www.youtube.com/watch?v=oFqOqVP4ZTU (3 pages).
(Continued)

*Primary Examiner* — Talha M Nawaz
(74) *Attorney, Agent, or Firm* — Maginot, Moore & Beck LLP

(57) ABSTRACT

A method is for operating a surround view camera system for a vehicle towing a trailer. The method includes generating first image data at a first time using a first imaging device operably connected to a front side of the vehicle or a rear side of the trailer, and generating second image data at a second time using the first imaging device. The second time is different from the first time. The method also includes generating third image data using a second imaging device operably connected to a rear side of the vehicle, and receiving vehicle data with a processor as generated by at least one vehicle sensor. The vehicle data corresponds to movement of the vehicle from the first time to the second time. The processor receives the generated first image data, the second image data, and the third image data.

20 Claims, 7 Drawing Sheets

Related U.S. Application Data

(60) Provisional application No. 63/662,287, filed on Jun. 20, 2024, provisional application No. 63/662,278, filed on Jun. 20, 2024.

(51) Int. Cl.
   *G06T 7/20*   (2017.01)
   *G06T 7/70*   (2017.01)
   *G06T 11/00*  (2006.01)
   *B60R 1/24*   (2022.01)
   *B60R 1/26*   (2022.01)

(52) U.S. Cl.
   CPC .............. *G06T 7/70* (2017.01); *G06T 11/00* (2013.01); *B60R 1/24* (2022.01); *B60R 1/26* (2022.01); *B60R 2300/105* (2013.01); *B60R 2300/30* (2013.01); *G06T 2207/30252* (2013.01)

(56) References Cited

U.S. PATENT DOCUMENTS

| | | | |
|---|---|---|---|
| 10,259,390 B2 | 4/2019 | Zhang et al. | |
| 10,899,277 B2 | 1/2021 | Goseberg et al. | |
| 11,220,216 B2 | 1/2022 | Murad et al. | |
| 11,380,046 B2 | 7/2022 | Dabral et al. | |
| 11,465,560 B2 | 10/2022 | Lu et al. | |
| 11,820,423 B2 | 11/2023 | Okouneva et al. | |
| 11,843,865 B2 | 12/2023 | Hu et al. | |
| 11,872,939 B2 | 1/2024 | Lu et al. | |
| 2016/0049020 A1* | 2/2016 | Kuehnle | G07C 5/0841 701/34.4 |
| 2017/0341582 A1 | 11/2017 | Friebe et al. | |
| 2019/0349571 A1 | 11/2019 | Herman et al. | |
| 2022/0135127 A1* | 5/2022 | Lu | B60R 11/04 701/41 |
| 2023/0099248 A1 | 3/2023 | Lu et al. | |
| 2025/0014354 A1* | 1/2025 | Dworak | G06V 20/58 |

OTHER PUBLICATIONS

ATOTO, ATOTO AC-HD03LR 720P Rearview Backup Camera (180° Wide-Angle), for ATOTO S8 Models only, VSV (Virtual Surround-View) Parking, LRV (Live Rear-View), Night Vision and Waterproof, https://www.myatoto.com/index/productDetail?productId=1585249312158875650&country=US, (12 Pages).

* cited by examiner

DEVICE AND METHOD FOR SURROUND VIEW CAMERA SYSTEM FOR VEHICLE AND TRAILER

This application is a continuation-in-part application of U.S. patent application Ser. No. 18/468,322, filed on Sep. 15, 2023. This application claims the benefit of priority to (i) U.S. provisional application Ser. No. 63/662,278, filed on Jun. 20, 2024, and (ii) U.S. provisional application Ser. No. 63/662,287, filed on Jun. 20, 2024. The complete subject matters and disclosures of each of the above-mentioned patent applications are hereby incorporated herein by reference, in their entireties.

FIELD

This disclosure relates to the field of camera systems for vehicles and, in particular, to generating images of the surroundings of a vehicle towing a trailer to assist with operating the vehicle and the trailer.

BACKGROUND

Vehicles, such as passenger cars, trucks, and commercial vehicles, typically include at least one camera mounted on a body of the vehicle. For example, some passenger cars include a front view camera, a left view camera, a right view camera, and a rearview camera. The cameras generate images that are shown on a display screen included as part of an infotainment system of the vehicle.

One approach taken by some automakers and original equipment manufacturers (OEMs) is to combine the images from the front view camera, the left view camera, the right view camera, and the rearview camera into a combined image that approximates an aerial view of the surroundings of the vehicle. The aerial view is also referred to as a top view, a surround view, a bird's eye view, and a 360° view. In addition to showing the surroundings of the vehicle on the display screen, the surround view also typically includes an icon representing the vehicle as viewed from above that is superimposed on the combined image, such that the operator of the vehicle can view the position of the vehicle relative to obstacles and features in the surroundings. The surround view is typically helpful for operators of the vehicle to navigate the vehicle in the forward direction and the reverse direction in avoidance of the obstacles.

An issue encountered with some surround view systems is that when towing a trailer with the vehicle, the surround view image does not show the surroundings of the trailer accurately and does not show a rear view of the vehicle accurately due to the trailer being very close to the rear of the vehicle. Moreover, the trailer may block at least a portion of the image as generated by the rearview camera. Thus, when towing a trailer, particularly a box trailer with tall sides, the typical surround view system loses some of its effectiveness, and is not particularly useful for assisting the operator in moving the trailer with the vehicle.

Based on the above, an alternative solution is desirable for surround view camera systems that operate effectively even when the vehicle is towing a trailer.

SUMMARY

According to an exemplary embodiment, a method is for operating a surround view camera system for a vehicle towing a trailer. The method includes generating first image data at a first time using a first imaging device operably connected to a front side of the vehicle or a rear side of the trailer, and generating second image data at a second time using the first imaging device. The second time is different from the first time. The method also includes generating third image data using a second imaging device operably connected to a rear side of the vehicle, and receiving vehicle data with a processor as generated by at least one vehicle sensor. The vehicle data corresponds to movement of the vehicle from the first time to the second time. The processor is operably connected to the first imaging device, the second imaging device, and the third imaging device to receive the generated first image data, the second image data, and the third image data. The method further includes processing the third image data to determine trailer position data corresponding to a position of the trailer relative to the vehicle at the first and second times, and generating historical surround view image data using the processor by combining the first image data and the second image data based on the vehicle data and/or the trailer position data. The historical surround view image data corresponds to at least a historical surround view image of the surroundings of the trailer. The method also includes operating the vehicle to maneuver the trailer based on the historical surround view image.

According to another exemplary embodiment of the disclosure, a surround view camera system for a vehicle towing a trailer includes a first imaging device, a second imaging device, at least one vehicle sensor, and a processor. The first imaging device is mounted to a front side of the vehicle or a rear side of the trailer and is configured (i) to generate first image data at a first time, and (ii) to generate second image data at a second time. The second time is different from the first time. The second imaging device is mounted to a rear side of the vehicle and is configured to generate third image data. The at least one vehicle sensor is mounted on the vehicle and is configured to generate vehicle data corresponding to movement of the vehicle from the first time to the second time. The processor is operably connected to the first imaging device, the second imaging device, the third imaging device, and the at least one vehicle sensor. The processor is configured to receive the first image data, the second image data, the third image data, and the vehicle data, and to process the third image data to determine trailer position data corresponding to a position of the trailer relative to the vehicle at the first and second times. The processor is further configured to generate historical surround view image data by combining the first image data and the second image data based on the vehicle data and/or the trailer position data. The historical surround view image data corresponds to at least a historical surround view image of the surroundings of the trailer. The vehicle is operated to maneuver the trailer based on the historical surround view image.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
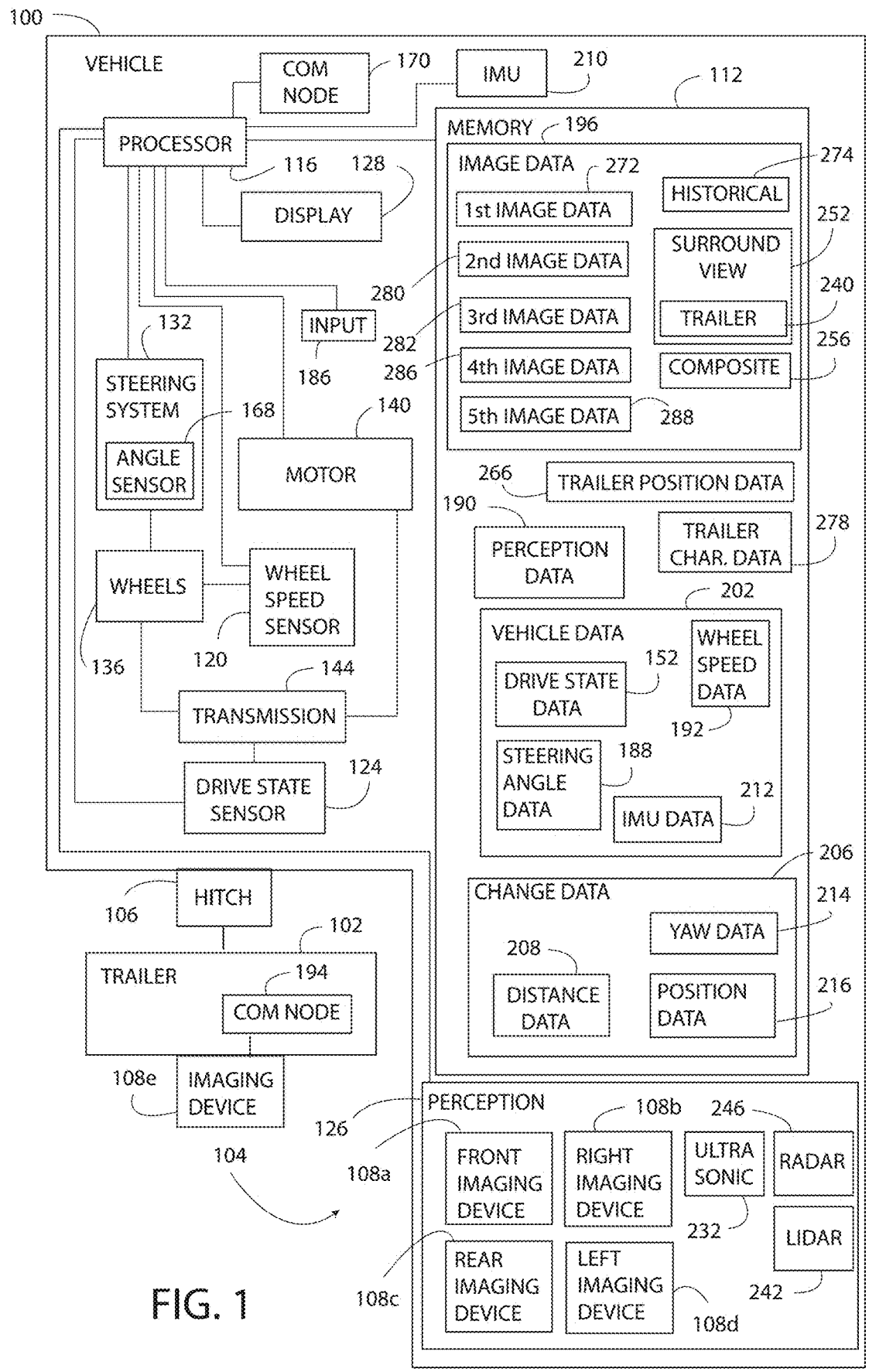
FIG. 1 is a block diagram of a vehicle and a trailer, the vehicle includes a surround view camera system, as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a vehicle 100 includes a corresponding trailer 102 operably connected thereto. The vehicle 100 includes a surround view camera system 104 having a plurality of imaging devices 108a, 108b, 108c, 108d, a memory 112, vehicle sensors 120, 124, 168, a perception sensor system 126, a display device 128, and an inertial measurement unit ("IMU") 210 each operably connected to a processor 116. The vehicle 100, which is also referred to herein as an ego vehicle, further includes a steering system 132 for steering at least two wheels 136 of the vehicle 100, as well as a motor 140 and a transmission 144 for generating and delivering a force for moving the vehicle 100 to at least one of the wheels 136.

The vehicle 100 further includes a hitch 106 to which the trailer 102 is removably connected. The hitch 106 configures the trailer 102 to move relative to the vehicle 100 about a point of connection 122 (FIGS. 2 and 4, also referred to as a point of rotation, a pivot point, and a hitch ball location), which is provided by a hitch ball (not shown), for example. The vehicle 100 pushes and pulls the trailer 102 to move the trailer 102. In some embodiments, an additional imaging device 108e is also mounted on a rear side of the trailer 102 and is operatively connected to the processor 116 of the vehicle 100 for at least the transmission of image data 196 generated by the imaging device 108e.

Figure 4:
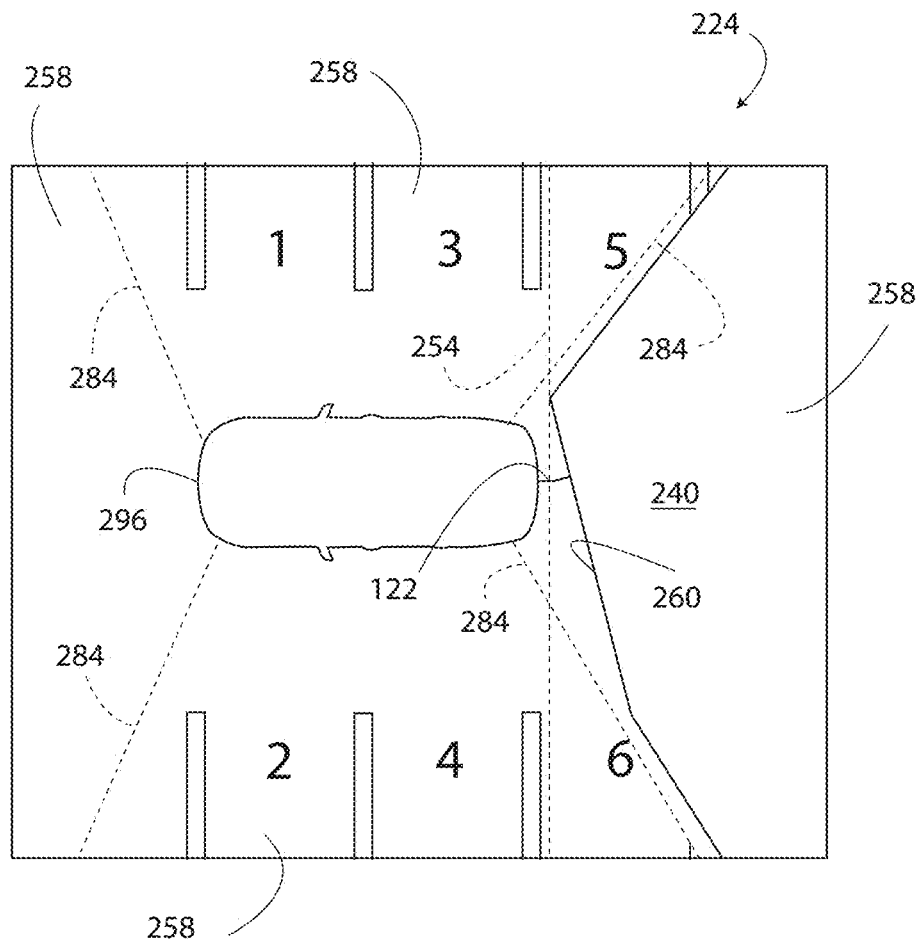
FIG. 4 illustrates a surround view image generated by the surround view camera system of the vehicle of FIG. 1 according to a Live View approach, the surround view image includes a view of the trailer at the rear of the vehicle.

As disclosed herein, the surround view camera system 104 generates a composite surround view image 238 (FIG. 8) of the surroundings of the vehicle 100 and the trailer 102. The surround view camera system 104 combines a "Live View" approach with a "Historical View" approach. The Live View approach generates real time surround view image data 252 of at least the surroundings of the vehicle 100. The Historical View approach generates historical image data 274 of at least the surroundings of the trailer 102. As shown in FIG. 4, the surround view image 224 cannot typically image the trailer 102 in a meaningful manner because the trailer 102 is too close to the imaging device 108c (FIG. 2) located on the rear side of the vehicle 100. As shown in FIG. 4, trailer image data 240 corresponds to a showing of the trailer 102 in a distorted manner and no information regarding the surroundings of the trailer 102 are provided by the surround view image 224. To improve the surround view image 224, the surround view camera system 104 combines images 258 (FIG. 4) from the Live View approach with images 262 (FIG. 6) from the Historical View approach to generate the composite surround view image 238. The composite surround view image 238 includes a vehicle icon 296 representing a top view of the vehicle 100, and a trailer icon 298 representing a top view of the trailer 102. The composite surround view image 238 shows the trailer 102 and the surroundings of the trailer 102 in a meaningful and useful manner. The composite surround view image 238 typically enables the operator of the vehicle 100 to navigate the vehicle 100 and to maneuver the trailer 102 with greater efficiency, by providing the operator with a view of the surroundings of the vehicle 100 and the trailer 102. According to a first approach the composite surround view image 238 (FIG. 8) is generated without the imaging device 108e on the trailer 102, and according to a second approach the composite surround view image 238 (FIG. 10) is generated with the imaging device 108e on the trailer 102.

Each component of the vehicle 100, the trailer 102, and the surround view camera system 104 is described below.

The vehicle 100, in one embodiment, is a passenger vehicle that may be occupant controlled (i.e., levels zero through four autonomous control). Additionally or alternatively, the vehicle 100 is fully-autonomously controlled (i.e., level five autonomous control), and can be switched to a mode in which an operator controls the movement of the vehicle 100 from either within the vehicle cabin or from a remote location outside of the vehicle cabin. For example, the vehicle 100 is provided as a personal vehicle, a rental car, a shuttle, a limousine, a corporate vehicle, a livery vehicle, a taxi, or a robo-taxi. The vehicle 100 is inclusive of any ground-based means of carrying or transporting something or someone, including automobiles, trucks, and tractors. The vehicle 100 includes road-going vehicles, private vehicles, commercial vehicles, off-road vehicles, recreational vehicles, and agricultural vehicles.

With reference to FIG. 1, the motor 140 is an electric motor that is also referred as a traction motor. The motor 140 generates a motive force for moving the vehicle 100. An output shaft (not shown) of the motor 140 is operably connected to the transmission 144 for transmitting torque to the transmission. In the illustrated embodiment, the motor 140 is a three-phase AC induction motor, but in other embodiments, the motor 140 is any suitable electric motor such as a brushless DC motor or a permanent magnet synchronous motor. Thus, in one embodiment, the vehicle 100 is a fully-electric vehicle. In another embodiment, the vehicle 100 also includes a combustion engine (not shown) operably connected to the transmission 144 and the electric motor 140, and the vehicle 100 is referred as a hybrid-electric vehicle. In yet another embodiment, the motor 140 includes only a combustion engine.

The transmission 144 of the vehicle 100 refers to the mechanical system for transferring torque from the motor 140 to the drive wheel(s) 136 to propel the vehicle 100 in either the forward direction or the reverse direction. In one embodiment, the transmission 144 is a one-speed transmission as is found in some electric vehicles. In other embodiments, the transmission 144 is a multi-speed automatic or manual transmission that includes multiple gears for moving the vehicle 100 in the forward direction, as is typically included with combustion engine vehicles.

The transmission 144, in one embodiment, has a park mode, a reverse mode, a neutral mode, and a drive mode, which are referred to collectively as drive states of the transmission 144. In the park mode, the transmission 144 is locked to hold the vehicle 100 in a stationary position, under most circumstances. In the reverse mode, the transmission 144 couples the motor 140 to the drive wheel(s) 136 in a manner that causes torque from the motor 140 to rotate the drive wheel(s) 136 in a direction that reverses the vehicle 100 (i.e., a reverse direction of movement). In the neutral mode, the transmission 144 decouples the motor 140 from the drive wheel(s) 136, such that the wheels 136 are free to rotate without connection to the motor 140. In the drive mode, the transmission 144 couples the motor 140 to the drive wheel(s) 136 in a manner that causes torque from the motor 140 to rotate the drive wheel(s) 136 in a direction that moves the vehicle 100 in a forward direction (i.e., a forward direction of movement).

As shown in FIG. 1, the drive state sensor 124 is operably connected to the transmission 144 for detecting the current drive state. The drive state sensor 124 generates drive state data 152 in real time, which corresponds to the presently-selected drive state of the transmission 144. The drive state data 152 indicates when the vehicle 100 is in the park mode, the reverse mode, the neutral mode, and the drive mode. The drive state data 152 is stored in the memory 112. In another embodiment, the drive state data 152 is generated by any other corresponding vehicle component and is provided to the processor 116 for storage in the memory 112.

The steering system 132, in one embodiment, is a steer-by-wire system, but may alternatively be provided as a typical mechanically operated power steering system. The steering system 132 has an operational connection to at least two of the wheels 136 (the front wheels 136 in this example) and is provided for influencing a travel direction of the vehicle 100.

The steering system 132 includes a steering angle sensor 168 that is operatively connected to the processor 116 and is configured to generate steering angle data 188 (FIG. 1) in real time. The angle sensor 168 is another vehicle sensor. The steering angle data 188 corresponds to the current steering angle of the vehicle 100. The steering angle data 188 is provided to the processor 116 and is stored in the memory 112. The angle sensor 168 is configured to sense the steering angle to generate the steering angle data 188 according to any desired approach.

With reference again to FIG. 1, the wheel speed sensor 120 is operatively connected to at least one of the vehicle wheels 136. The wheel speed sensor 120 is configured to generate wheel speed data 192 in real time. The wheel speed data 192 corresponds to a rotational speed of the monitored wheel 136 and, thus, also corresponds to a speed of the vehicle 100 in most conditions (i.e., a vehicle speed). The wheel speed sensor 120 may be connected to a non-driven wheel 136. In an exemplary embodiment, the wheel speed data 192 indicates the rotation of the monitored wheel 136 in rotations per minute (rpm), degrees per second, or any other unit of measurement. The wheel speed sensor 120, in one embodiment, is included an antilock braking system of the vehicle 100 and/or a vehicle stability control system of the vehicle 100.

The inertial measurement unit (IMU) 210 is configured to generate speed data and rotation data (i.e., IMU data 212). That is, the IMU 210 does not generate the wheel speed data 192 and the steering angle data 188, but instead generates other data based on detected movements of the vehicle 100. The IMU 210 may be included in the stability control system of the vehicle 100, for example. The IMU 210 may include a multi-axis accelerometer and a gyroscope, for example.

Each of the imaging devices 108a, 108b, 108c, 108d is a digital imaging device or digital camera configured to generate electronic image data 196 (including first image data 272, second image data 280, third image data 282, fourth image data 286, and fifth image data 288) representing the surroundings of the vehicle 100 and/or the trailer 102. For example, the imaging device 108a, 108b, 108c, 108d includes a complementary metal-oxide semiconductor (CMOS) sensor that generates the image data 196 in response to image inputs in the form of light. The imaging devices 108a, 108b, 108c, 108d are also referred to herein as a camera and/or a snapshot camera. The image data 196 generated by the imaging devices 108a, 108b, 108c, 108d corresponds to images 258 (FIG. 4) and 262 (FIG. 6) that are combined to form the surround views 224, 236, 238 of the vehicle 100 and the trailer 102. The imaging devices 108a, 108b, 108c, 108d generate the image data 196 when the vehicle 100 is stationary and when the vehicle 100 is traveling below a predetermined speed. The predetermined speed, in one example, is fifteen kilometers per hour and may range from five kilometers per hour to thirty kilometers per hour, depending on the embodiment.

The imaging devices 108a, 108b, 108c, 108d are electrically connected to the processor 116 with a wired and/or a wireless connection for the transmission of the image data 196 to the processor 116. For example, a communication node 170 is configured to establish an electrical connection between the imaging devices 108a, 108b, 108c, 108d and the processor 116. In a wireless configuration, the communication node 170 (FIG. 1) (also referred to as a vehicle-to-trailer (V2T) communication node) is configured for wireless data transfer with at least one corresponding communication node (not shown) of the imaging devices 108a, 108b, 108c, 108d. The communication node 170 and the imaging devices 108a, 108b, 108c, 108d exchange electronic data using a wireless local area network ("Wi-Fi"), a personal area network, Bluetooth®, and/or any other wireless network protocol. In a wired configuration, the communication node 170 is electrically connected to the at least one corresponding communication node of the imaging devices 108a, 108b, 108c, 108d with a dedicated wired connection or a shared wired connection of the vehicle 100.

Figure 2:
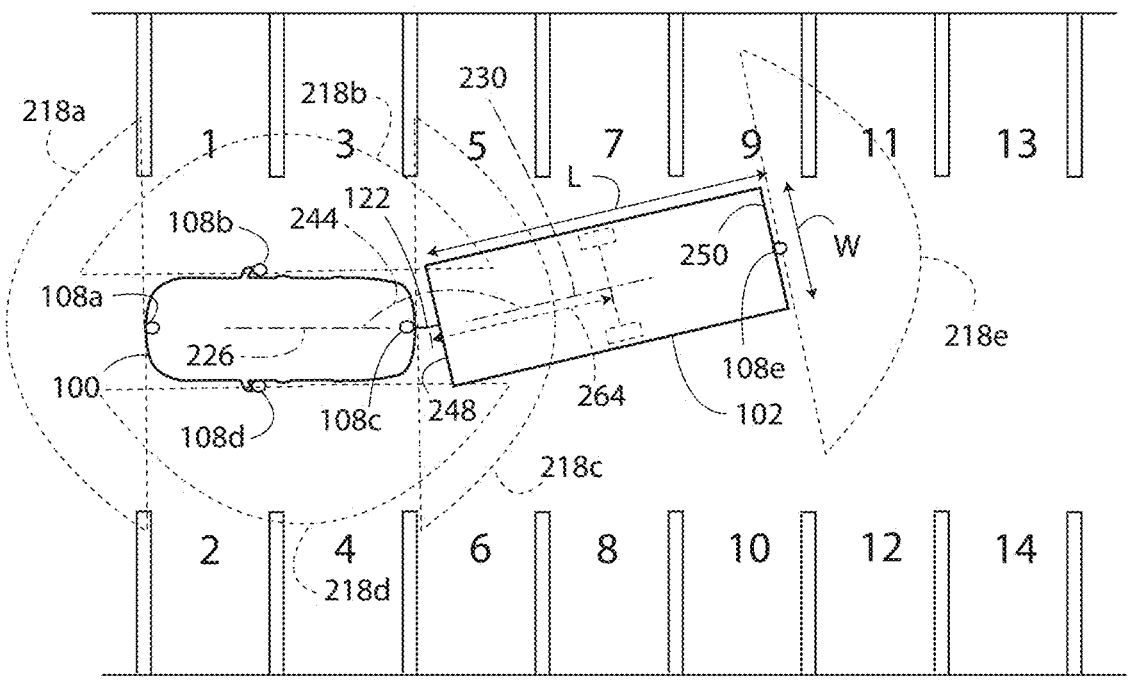
FIG. 2 is a block diagram showing an aerial view of a parking situation including the vehicle and the trailer of FIG. 1 positioned in a parking lot.

As shown in FIG. 2, the imaging devices 108a, 108b, 108c, 108d are mounted and/or positioned on the vehicle 100 so that fields of view 218a, 218b, 218c, 218d of the imaging devices 108a, 108b, 108c, 108d include the surroundings of the vehicle 100. FIG. 2 does not illustrate the composite surround view image 238 generated by the surround view camera system 104. Instead, FIG. 2 illustrates a block diagram of an exemplary scenario in which the vehicle 100 and trailer 102 are operated, as viewed from above. As shown in FIG. 2, the vehicle 100 and trailer 102 are operated on a surface parking lot in a parking situation. The parking spaces are numbered from 1-14.

In an embodiment, a front imaging device 108a is mounted on the front side of the vehicle 100 so that the field of view 218a includes the surroundings of the vehicle 100 encountered as the vehicle 100 moves in a forward direction. A right imaging device 108b is mounted on the right side of the vehicle 100 so that the field of view 218b includes the surroundings of the vehicle 100 located on the right side of the vehicle 100. A rear imaging device 108c is mounted on the rear side of the vehicle 100 so that the field of view 218c includes the surroundings of the vehicle 100 encountered as the vehicle 100 moves in a reverse direction. The rear imaging device 108c, in some embodiments, corresponds to the rear view camera (also referred to as a backup camera) that is required on some vehicles. A left imaging device 108d is mounted on the left side of the vehicle 100 so that the field of view 218d includes the surroundings of the vehicle 100 located on the left side of the vehicle 100.

With reference again to FIG. 1, the perception sensor system 126 is mounted on the vehicle 100 and is configured to detect objects and/or obstacles in the surroundings of the vehicle 100, including detection of the trailer 102 and the position of the trailer 102 relative to the vehicle 100. The perception sensor system 126 includes at least one of an ultrasonic sensor system 232, a light detection and ranging system ("LiDAR" or "LIDAR") 242, and a radar system (radio detection and ranging) 246. The perception sensor system 126 is operably connected to the processor 116 to provide the processor 116 with perception data 190 corresponding to the surroundings of the vehicle 100 including the trailer 102. Moreover, in some embodiments, including the illustrated embodiment, the perception sensor system 126 includes the imaging devices 108a, 108b, 108c, 108d as well as the imaging device 108e (when present on the trailer 102). As such, the imaging devices 108a, 108b, 108c, 108d, 108e are additional sensors that are configured to generate data (i.e., the image data 196) corresponding to the surroundings of the vehicle 100 including the trailer 102 and the position of the trailer 102 relative to the vehicle 100.

The ultrasonic sensor system 232 is configured to generate perception data 190 (FIG. 1) corresponding to a distance between the vehicle 100 and objects in the surroundings of the vehicle 100 including the trailer 102. The ultrasonic sensor system 232 is also used by the vehicle 100 during parking operations of the vehicle 100, for example.

The LiDAR system 242 is configured to generate perception data 190 corresponding to a high-resolution 3D model of the surroundings of the vehicle 100 from which the LiDar system 242 detects objects and/or the processor 116 detects the objects. The objects detected and included in the 3D model are identified by size (height, width, depth, and/or length) and type. The perception data 190 generated by the LiDAR system 242 is also referred to as a point cloud. The LiDAR system 242 is configured to detect and to model the trailer 102 when the trailer 102 is connected to the vehicle 100.

The radar system 246 is configured to generate perception data 190 corresponding to the position and trajectories of the objects in the surroundings of the vehicle 100, including the trailer 102. For example, the radar system 246 is useful for detecting when objects in the surroundings of the vehicle 100 are moving, such as pedestrians, other vehicles, and animals. In the example of FIG. 2, the radar system 246 is configured to detect the position of the trailer 102 relative to the vehicle 100 as well as real time changes in the detected position of the trailer 102. The perception data 190 from the radar system 246 includes, but is not limited to, distance, velocity, direction or bearing, and angular size of the objects in the surroundings of the vehicle 100.

With reference again to FIG. 1, the display device 128 is operably connected to the processor 116 and, in one embodiment, is a liquid crystal display (LCD) panel configured to display text, images, video, and other visually comprehensible data. In one embodiment, the display device 128 is positioned in a center stack of the cabin of the vehicle 100 and may be shared with other functions of the vehicle 100, such as the stereo system and climate controls. The display device 128 is configured to display the composite surround view image 238 (FIG. 8), the surround view image 224 (FIG. 4), and the historical surround view image 236 (FIG. 6) generated by the surround view camera system 104 in real time. Specifically, the display device 128 is configured to display the most currently-generated composite surround view image 238, the most currently-generated surround view image 224, or the most currently-generated historical surround view image 236, so that the display device 128 displays a bird's eye video of the current surroundings of the vehicle 100 and the trailer 102, as the vehicle 100 and the trailer 102 are moved and as the vehicle 100 and the trailer 102 are stationary. The display device 128, in another embodiment, is any display as desired by those of ordinary skill in the art, including, but not limited to, an active-matrix organic light-emitting diode display. In an example, the display device 128 is the display screen of a smartphone (not shown) operably connected to the vehicle 100. The display device 128 may also be the display screen of a remote computer system (not shown) that is spaced apart from the vehicle 100 and electronically connected to the vehicle 100 through a wireless computer network and/or a cellular network. In such an embodiment, the vehicle 100 includes a transceiver for electronically communicating with the network.

The display device 128, in one embodiment, includes a touch screen or other input device 186 for receiving user inputs, such as a user input for activating the surround view camera system 104. In other embodiments, the input device 186 is provided as one or more buttons, switches, knobs, or the like. An operator or occupant of the vehicle 100 can operate the surround view camera system 104 by inputting corresponding data using the input device 186.

As shown in FIG. 1, the memory 112 is an electronic storage device that is configured to store at least the perception data 190, the image data 196, vehicle data 202, change data 206, trailer position data 266, and trailer characteristic data 278. The memory 112 is also referred to herein as a non-transient computer readable storage medium.

The processor 116 (FIG. 1) is a structural device configured to execute program instructions in order to operate the surround view camera system 104 for generating the surround view image 224, the historical surround view image 236, and the composite surround view image 238. The processor 116 is provided as at least one microcontroller and/or microprocessor. The processor 116 may also be implemented with a general purpose processor, a digital signal processor (DSP), an application specific integrated circuit (ASIC), a field programmable gate array (FPGA), a graphics processing unit (GPU), an image signal processor (ISP) or other programmable logic device, discrete gate or transistor logic, discrete hardware components, or any combination thereof designed to perform the functions described herein. A general-purpose processor may be a microprocessor, but in the alternative, the processor 116 may be any conventional processor, controller, microcontroller, or state machine. The processor 116 may also be implemented as a combination of computing devices, e.g., a combination of a DSP and a microprocessor, a plurality of microprocessors, one or more microprocessors in conjunction with a DSP core, or any other such configuration. In one embodiment, the processor 116 is provided as the electronic control unit (ECU) (not shown) of the vehicle 100, such that the ECU is used to generate the surround view image 224, the historical surround view image 236, and the composite surround view image 238.

In FIG. 1, the processor 116 is connected directly to several of the vehicle components. In another embodiment the processor 116 and the vehicle components are each operatively connected to bus system (not shown) for the transfer of the data used to operate the vehicle 100 including the surround view camera system 104. An exemplary bus system is the controller area network bus (CAN bus).

The processor 116 is configured to generate certain electrical data that is used to generate the surround view images 224, 236, 238. For example, the processor 116 generates distance data 208 based on the wheel speed data 120, the perception data 190, and/or the IMU data 212. The distance data 208 corresponds to how far the vehicle 100 and/or the trailer 102 has moved on the ground. The distance data 208 is determined similarly or the same as odometry data of the vehicle 100 is determined. Odometry data is shown in an odometer portion of the vehicle 100 dashboard, for example. In some embodiments, however, the distance data 208 is more accurately determined than the odometry data. For example, by using the wheel speed data 192 and a known diameter of the wheel (and tire), the processor 116 can determine distance data 208 accurate to within a centimeter or less. The distance data 208 may additionally or alternatively be determined using the ultrasonic sensor system 232, the LiDAR 242, and/or the radar 246.

The processor 116 is also configured to generate yaw data 214 based on the steering angle data 188, the perception data 190, and/or the IMU data 212. The yaw data 214 corresponds to a rotational position of the vehicle 100 about a yaw axis. The yaw axis extends vertically through the vehicle 100. The yaw data 214 is stored in the memory 112. The yaw position is the rotational position about the yaw axis of the vehicle 100.

The processor 116 is further configured to generate change data 206 based on the vehicle data 202 generated by the vehicle sensors 120, 124, 168, the perception sensor system 126, and the IMU 210. The change data 206, in one example, corresponds to a change in position of the vehicle 100 and the trailer 102 at each position for which one of the images 258, 262 is generated by the imaging device 108. The change data 206 may include position data 216 that corresponds to the position of the vehicle 100 and/or the trailer 102 on a selected coordinate system (such as an X-Y coordinate system) when the images 258, 262 are taken. The change data 206 is stored in the memory 112. For example, the change data 206 includes the distance data 208 and the yaw data 214 so that the processor 116 can determine the position data 216 corresponding to how far and with what yaw angle the vehicle 100 and/or the trailer 102 has moved from each position at which an image 258, 262 is generated. Any other data to determine an accurate position of the vehicle 100 and/or the trailer 102 may also be included in the change data 206 generated by the processor 116, such as compass heading data of the vehicle 100 and/or the trailer 102, as may be provided by an electronic compass sensor of the vehicle 100 (i.e., another vehicle sensor).

With reference again to FIG. 2, the trailer 102 is a wheeled assembly that is pulled behind the vehicle 100 using the motive force of the vehicle 100. In the exemplary embodiment of FIG. 2, the trailer 102 is a box trailer having tall sides (i.e., from one to three meters tall) and a roof. In other embodiments, the trailer 102 is a flat trailer, an open trailer, and/or a landscape trailer without sides and a roof.

As shown in FIG. 2, the exemplary trailer 102 is rectangular and defines dimensions including a length L, a width W, and a height (not shown). The dimensions of the trailer 102 are saved to the memory 112 as the trailer characteristic data 278. The trailer characteristic data 278 are provided to the processor 116 for generating the historical surround view image 236 and the composite surround view image 238. In one embodiment, the input device 186 associated with the display device 128 is configured to receive inputs corresponding to the trailer characteristic data 278 from the operator of the vehicle 100. In another embodiment, the trailer characteristic data 278 is automatically provided to the processor 116 when an electrical connection is established between the vehicle 100 and the trailer 102. In a further embodiment, machine learning (ML) and/or computer vision (CV) are used to determine the trailer characteristic data 278 by processing at least the image data 196 from at least the imaging device 108c mounted on the rear side of the vehicle 100. Any other desired trailer information, in addition to the length L, width W, and height H of the trailer 102 may also be included in the trailer characteristic data 278. For example, the distance of a front wall 248 (FIG. 2) of the trailer 102 from the hitch 106 or the point of connection 122 may be included in the trailer characteristic data 278, which is also referred to as a tongue length or a tongue bar length. The trailer characteristic data 278 may further include data indicating a number of wheels included on the trailer 102 (two wheels single axle (as shown in FIG. 2), four wheels double axle, six wheels triple axle, for example), a beam length 264 (FIG. 2) of the trailer 102, a wheelbase of the trailer 102, and/or a trailer effective length. The trailer effective length is measured from the hitch ball or the point of connection 122 to an axle of the trailer 102 and is used to determine an arc and/or a radius traveled by the trailer 102 in response to being moved by the vehicle 100. The trailer beam length 264 is a distance between the hitch ball location (i.e., the point of connection 122) and a centerline of the axle of a single axle trailer 102. The trailer characteristic data 278 may further include a track width of the trailer 102, a type of the trailer 102 (box, landscape, utility), a trailer recognition identification, and a trailer connection status identifying when the trailer 102 is connected to the vehicle 100 and when the trailer 102 is not connected to the vehicle 100.

In the example of FIG. 2, the trailer 102 includes an imaging device 108e that is the same as the imaging devices 108a, 108b, 108c, 108d of the vehicle 100 and also generates the image data 196. The trailer 102, in at least one embodiment, also includes a communication node 194 that is operably connected to the imaging device 108e to receive the image data 196 generated by the imaging device 108e. The communication node 194 wirelessly transmits the image data 196 from the imaging device 108e to the communication node 170 of the vehicle 100 for processing by the processor 116. In another embodiment, a shared or dedicated wired connection is made between the imaging device 108e and the processor 116, through the communication node 170, for the transmission of the image data 196 generated by the imaging device 108e.

The imaging device 108e is mounted on a rear side 250 of the trailer 102 and defines a corresponding field of view 218e that includes surroundings of the trailer 102 located behind the trailer 102. The surround view system 104 is configured to generate the composite surround view image 238 (i) without the imagining device 108e mounted on the trailer 102 (as in FIG. 8), and (ii) with the imagining device 108e mounted on the trailer 102 (as in FIG. 10). Accordingly, the imagining device 108e mounted on the trailer 102 is not required for generation of the composite surround view image 238.

In FIG. 2, the trailer 102 defines a longitudinal axis 226, and the vehicle 100 defines a longitudinal axis 230. An angle 244 (also referred to as a trailer-to-vehicle angle (T2V angle)) is defined between the longitudinal axes 226, 230 corresponding to a position of the trailer 102 relative to the vehicle 100. A vertex of the angle 244 is located approximately at the point of connection 122 and/or the hitch 106. The angle 244 is saved in the memory 112 as part of the trailer position data 266. When the vehicle 100 is moving straight without turning, then the angle 244 is approximately 180°, because the axes 226, 230 are aligned with each other. When the vehicle 100 turns when moving forward or backward, then the angle 244 changes. According to an exemplary coordinate system, the angle 244 as shown in FIG. 2 is less than 180° at about 170°. When the vehicle 100 is positioned on the other side of the longitudinal axis 230 of the trailer 102, then the angle 244 is greater than 180°.

The surround view camera system 104 is configured to automatically determine the trailer position data 266. According to an exemplary approach, the surround view camera 104 system uses the third image data 282 from the rear imaging device 108c mounted on the rear side of the vehicle 100 in order to determine the trailer position data 266 that indicates the angle 244 of the trailer 102 relative to the vehicle 100 as well as a position of the point of connection 122 (i.e., a hitch ball position). As the vehicle 100 is driving forwards and backwards, the trailer 102 may take any angle 244 within a predetermined range of angles 244 relative to the vehicle 100 as the trailer 102 pivots about the point of connection 122. In all of these angles 244, however, the trailer 102 is at least partially visible in the third image data 282 of the rear imaging device 108c of the vehicle 100. Specifically, at least the front wall 248 (FIG. 2) or a front bar of the trailer 102 appears in the third image data 282 for all of the available angles 244 of the trailer 102. As an example, FIG. 4 shows a graphic representation 260 of the front wall 248 of the trailer 102 from the third image data 282. The front wall 248 is perpendicular to the longitudinal axis 230 of the trailer 102, however, the front wall 248 and other parts of the trailer 102 appear with distortion as imaged by the rear imaging device 108c due the close positioning of the trailer 102 to the imaging device 108c. By processing the graphic representation 260 of the front wall 248 of the trailer 102 as shown in the third image data 282, the surround view camera system 104 is configured to determine the angle 244 that is included in the trailer position data 266. This approach is an image processing technique for identifying the trailer position data 266. In one embodiment, the trailer position data 266 is continuously updated in real time during operation of the surround view camera system 104. Thus, according to this approach, the imaging device 108c is the perception sensor for determining the trailer position data 266.

The processing performed to determine the trailer position data 266 may additionally or alternatively be performed by an advanced driver-assistance system (ADAS) that is configured to data mine the image data 196 from the imaging device 108c in order to identify the point of connection 122 in the image data 196 and the location and position of the trailer 102 in the image data 196. Thus, machine learning (ML) and/or computer vision (CV) are usable to determine the trailer position data 266 and the point of connection 122.

Additionally or alternatively, the surround view camera system 104 uses the perception data 190 from the ultrasonic sensor system 232, the LIDAR system 242, and/or the radar system 246 to determine, improve, and/or augment the trailer position data 266. For example, the vehicle 100 typically includes ultrasonic sensors (not shown) of the ultrasonic sensor system 232 on the rear bumper of the vehicle 100 to assist with parking operations of the vehicle 100. The trailer position data 266, therefore, may at least be partially generated and/or verified by detecting the relative position of the front wall 248 relative to the rear side of the vehicle 100. For example, by detecting (i) a first distance between the front wall 248 of the trailer 102 and a left rear ultrasonic sensor, and (ii) a second distance between the front wall 248 of the trailer 102 and a right ultrasonic sensor, the processor 116 is able to determine the angle 244. The other systems of the perception system 126, including the LiDAR system 242 and the radar system 246 are able to determine and/or to verify the trailer position data 266 in a corresponding manner.

Additionally or alternatively, the trailer position data 266 is input manually by the operator of the vehicle 100. For example, using the touchscreen of the display device 128, the operator is able to move a graphic representation of the trailer 102 and/or the point of connection 122, as shown on the display device 128 (i.e., the trailer icon 298) to correspond to the current position of the trailer 102 relative to the vehicle 100. Such an approach, in some embodiments, is useful for an initialization of the surround view camera system 104.

Figure 3:
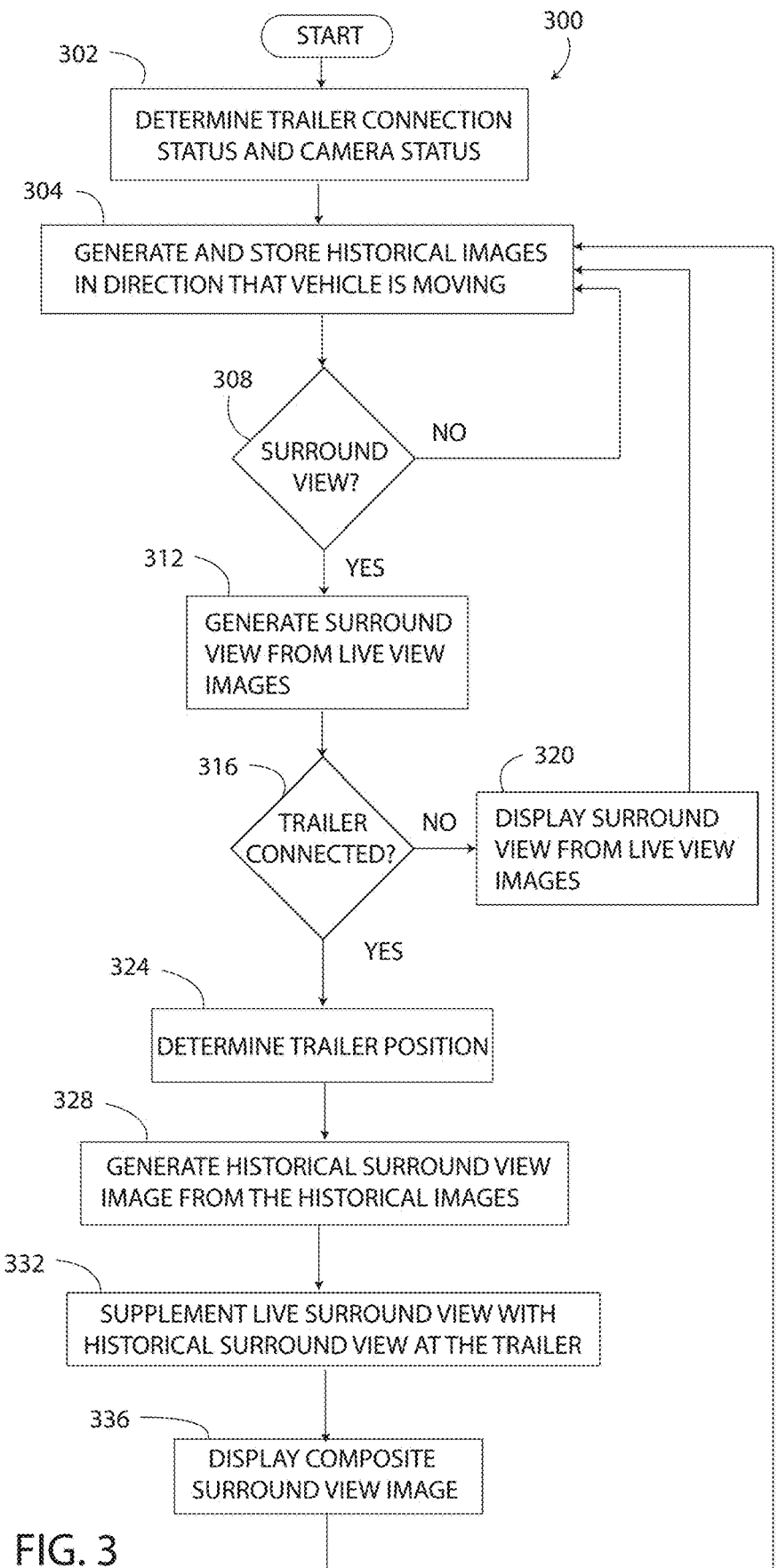
FIG. 3 is a flowchart illustrating an exemplary method of operating the surround view camera system of FIG. 1.

In operation, and with reference to the flowchart of FIG. 3, the surround view camera system 104 is configured to implement a method 300 of generating a continuously-updated composite surround view image 238 (FIGS. 8 and 10) representing the surroundings of the vehicle 100 and the trailer 102 to aid in maneuvering the trailer 102 using the vehicle 100. This first embodiment of the method 300 is described based on a system that includes four of the imaging devices 108a, 108b, 108c, 108d mounted on the vehicle 100 and no imaging devices (zero imaging devices) mounted on the trailer 102.

The method 300 operates by simultaneously performing two surround view generation techniques. The first surround view generation technique is termed the "Live View" approach, and the second surround view generation technique is termed the "Historical View" approach. According to the Live View approach, four real-time images 258 (FIG. 4) from the imaging devices 108a, 108b, 108c, 108d on the vehicle 100 are combined together to form the surround view image 224. The surround view image 224 shows a live view of the surroundings of the vehicle 100 including motion and movement of objects in the surroundings of the vehicle 100. According to the Historical View approach, portions of past or "historical" images 262 (FIG. 6) (i.e., from a few seconds ago or a few minutes ago) from the imaging devices (the front imaging device 108a in this example) are combined using the vehicle data 202, the change data 206, and the perception data 190 to form the historical surround view 236 (FIG. 6, also referred to as a history image) of the surroundings of the vehicle 100. In the Historical View approach, due to the position of the imaging devices 108a, 108b, 108d at least portions of the resultant images 262 show surroundings in which the vehicle 100 was previously located and the trailer 102 is currently located (or was also previously located). The historical surround view 236 shows the surroundings of the vehicle 100 and the trailer 102 without motion or movement of the objects in the surroundings. The historical surround view 236; thus, is not a live view of the surroundings of the vehicle 100 and the trailer 102. Additionally, the method 300 removes a non-optimal showing of the trailer 102 from the surround view image 234 generated using the Live View approach and selectively replaces the removed trailer image data 240 (FIG. 4) with the historical image data 274 from the Historical View approach. The full process is described below.

At block 302 of the method 300, the processor 116 determines the connection status of the trailer 102 and the status of the imaging device 108e (i.e., the camera status). The trailer connection status indicates whether or not the trailer 102 is connected to the vehicle 100. To determine if the trailer 102 is present and/or is connected to the vehicle 100, in one embodiment, the surround view camera 104 system processes the third image data 282 that is generated by the rear imaging device 108c connected to the rear side of the vehicle 100. In particular, the processor 116 performs image processing on the third image data 282 to detect when the trailer 102 is present, for example, by matching the trailer data 240 of the third image data 282 with known images of the trailer 102 stored in the memory 112. Any other image processing technique may also be used to determine if the trailer 102 is connected to the vehicle 100, including using ML and CV. According to another embodiment, the surround view camera system 104 determines that the trailer 102 is connected to the vehicle 100 based on the electrical connection between the trailer 102 and the vehicle 100. That is, the previously-mentioned electrical connection, such as for the brake lights and turn signals of the trailer 102, is used to detect that the trailer 102 is present by monitoring for current draw by the trailer 102 from the vehicle 100. When current draw is present, such as when the brake lights of the trailer 102 are activated, then the vehicle 100 determines that the trailer 102 is connected. According to a further approach, the perception sensor system 126 is used to determine when the trailer 102 is connected to the vehicle 100 by detecting the presence of the trailer 102 with the at least one of the ultrasonic system 232, the LiDAR system 242, and the radar system 246. Any other approach may be additionally or alternatively be used at block 316 for determining and/or verifying when the trailer 102 is connected to the vehicle 100.

Block 302 of the method 300 also includes determining the camera status, which refers to detecting the presence or absence of the imaging device 108e mounted on the trailer 102. The processor 116 determines that the imaging device 108e is present by acquiring or attempting to acquire the image data 196 from the imaging device 108e.

Thus, at block 302 the processor 116 determines whether or not the trailer 102 is connected to the vehicle 100, and whether or not the imaging device 108e is present and operationally connected to the processor 116. The steps of block 302 are performed at the beginning of the method 300 so that the processor 116 is able to determine an optimal approach for operating the surround view camera system 104 based on the current configuration of the vehicle 100, trailer 102, and/or imaging device 108e. That is, at block 302, the processor 116 determines if the composite surround view image 238 should be generated according to the approach of FIG. 8 or FIG. 10.

Figure 5:
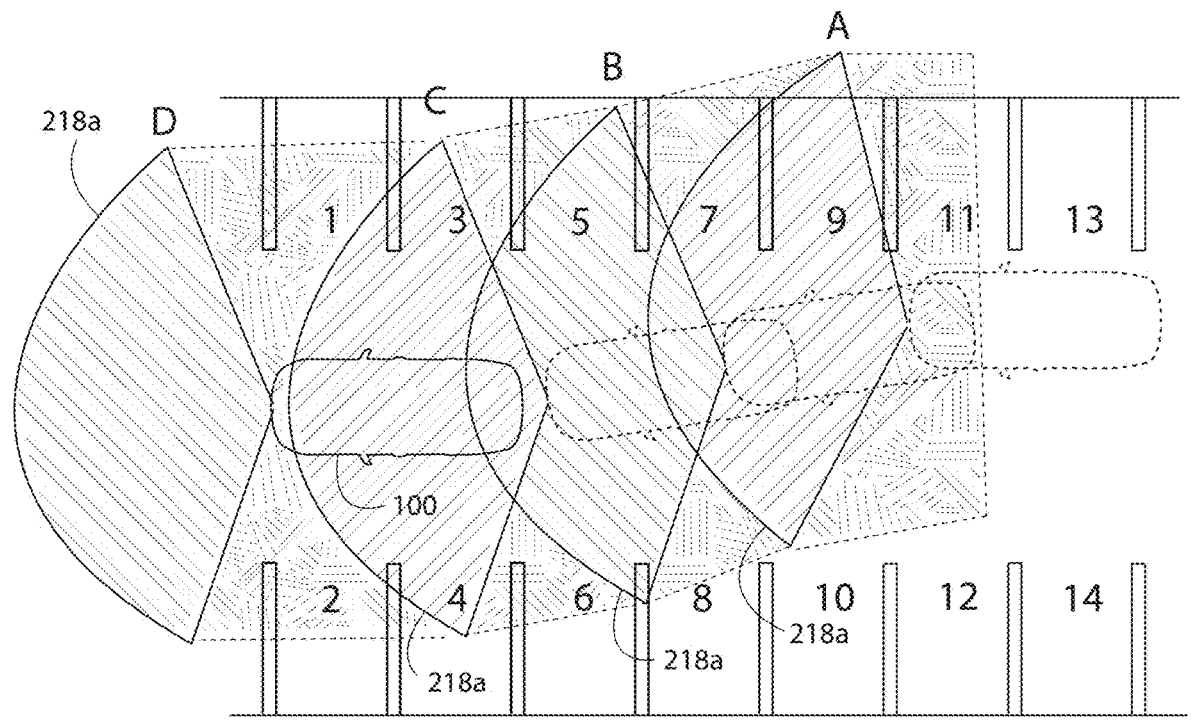
FIG. 5 is another block diagram of the parking situation of FIG. 2 showing the vehicle in four different positions (A, B, C, and D) in the parking lot.
Figure 6:
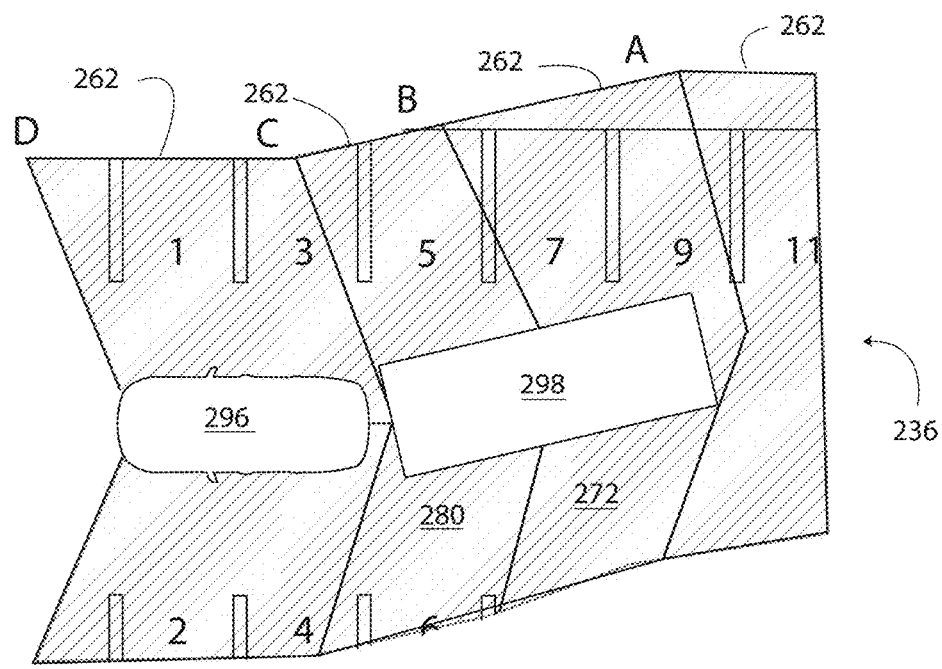
FIG. 6 illustrates a historical surround view image generated by the surround view camera system of the vehicle of FIG. 1 according to a Historical View approach, the historical surround view image includes the area surrounding and underneath the trailer.

At block 304 of the method 300 and with reference to FIGS. 5 and 6, the processor 116 generates the images 262 that are used to form the historical surround view 236. In the example of FIGS. 5 and 6, the processor 116 has determined that the trailer 102 is connected to the vehicle 100 and that the trailer 102 does not include the imaging device 108e. The images 262 used in the Historical View approach are generated even when a call for the surround view camera system 104 has not been made by the operator of the vehicle 100 or by any other system. This is because the Historical View approach relies on historical images 262. As result, in one embodiment, whenever the vehicle 100 is moving below the predetermined speed, the method 300 includes at least generating the images 262 of the Historical View approach so that the historical surround view image 236 showing the surroundings of the trailer 102 can be generated, if needed. The images 262 are saved to the memory 112 as the first image data 272 and the second image data 280 and, in one embodiment, have a corresponding time stamp indicating a time when the image data 272, 280 was generated. In an embodiment, the first image data 272 is generated by the front imaging device 108a and/or the side imaging devices 108b, 108d at a first time with the vehicle 100 at position A. Then, the vehicle 100 moves to position B, and the second image data 280 is generated by the front imaging device 108a and/or the side imaging devices 108b, 108d at a second time after the first time (i.e., the second time is different from the first time). This process repeats for each position of the vehicle 100, as the vehicle 100 moves forwards and backwards at a speed less than the predetermined speed.

In FIG. 5, the processor 116 uses the vehicle data 202, which includes the drive state data 152, the perception data 190, vehicle system fault data, and/or the IMU data 212, to determine if the vehicle 100 is moving in the forward direction or the reverse direction. The vehicle data 202, thus, corresponds to movement of the vehicle 100 from the first time to the second time (for example, from position A to position B). Note that for clarity, in the example of FIG. 5 the trailer 102 is not illustrated, but is included in this example. When the processor 116 determines that the vehicle 100 is moving in the forward direction, the processor 116 activates at least the front imaging device 108a to generate the first and second image data 272, 280 of the Historical View approach. Alternatively, when the processor 116 determines (i) that the vehicle 100 is moving in the reverse direction, (ii) the trailer 102 is connected to the vehicle 100, and (iii) the imaging device 108e is present, then the processor 116 activates the imaging device 108e and/or the side imaging devices 108b, 108d to generate the first and second image data 272, 280 of the Historical View approach, as is also described below in connection with FIGS. 9 and 10. The first and second image data 272, 280 of the Historical View approach are generated using at least the imaging device 108a, 108e that is facing the direction of movement of the vehicle 100. The left side imaging device 108b and the right side imaging device 108c are used in the generation of the image data 272, 280 when the vehicle 100 is turning as is determined from the steering angle data 188. When the trailer 102 is connected, the rear imaging device 108c of the vehicle 100 is not typically used to generate the first and second image data 272, 280 of the Historical View approach, because the rear imaging device 108c mostly images the trailer 102 (i.e., is mostly blocked by the trailer 102).

Also at block 304, at each of the positions A, B, C, D that the imaging device 108a generates an image 262, the processor 116 associates corresponding change data 206 with the images 262. Note that the imaging device 108a may take many more image than what is shown in the illustrated example at many more incremental positions between the positions A and D. The change data 206, as noted, indicates the change in position of the vehicle 100 from each position that an image 262 is generated. As explained below, the change data 206 is used to stitch together and to combine portions of the images 262 to form the historical surround view 236, when the processor 116 determines that the historical surround view 236 is required. In one embodiment, however, to save computing resources no combining of the images 262 is performed unless the historical surround view image 236 is needed, such as when the request for the surround view image 224 is made.

Next, at block 308 of FIG. 3, the processor 116 determines if the operator of the vehicle 100 has made a request to show the surround view image 224 on the display device 128 or if the surround view image 224 is required for any other reason. If no request for the surround view image 224 has been made, then the method 300 continues to generate the first and second image data 272, 280 of the Historical View approach at block 304 when the vehicle 100 is moving below the predetermined speed. If a request for the surround view image 224 has been made, then the method 300 proceeds to block 312.

At block 312 and with reference to FIG. 4, the processor 116 generates the surround view image 224 according to the Live View approach based on the call for the surround view image 224. The surround view image 224 is a combination of four images 258 as generated by each of the imaging devices 108a, 108b, 108c, 108d from the image data 196 (including at least some of the first, second, third, fourth, and fifth image data 272, 280, 282, 286, 288). For example, the fourth image data 286 are generated by the left side imaging device 108d, and the fifth image data 288 are generated by the right side imaging device 108b. The images 258 are saved to the memory 112 as the surround view image data 252 along with, in one embodiment, a corresponding time stamp indicating a time when the surround view image data 252 was generated. The dashed lines 284 in FIG. 4 approximate the locations of the joints of the images 258. The surround view image 224 includes a view of the trailer 102 (shown as the trailer image data 240), but it is generally a view of the trailer 102 that is unhelpful for navigating the vehicle 100 and/or the trailer 102. At block 312, the surround view data 252 of the surround view image 224 is generated but is not shown on the display device 128 of the vehicle 100 until additional processing is performed.

With reference to block 316, the method 300 diverges depending in the previously-determined connection status of the trailer 102. When the trailer 102 is not connected, then the Live View surround view image 224 is typically suitable for showing on the display device 128. However, when the trailer 102 is connected, then the surround view camera system 104 generates a view of the surroundings of the trailer 102 in addition to the surroundings of the vehicle 100 by generating the historical surround view image 236.

At block 320 of the method 300, when the trailer 102 is not connected to the vehicle 100, then the surround view camera system 104 displays the surround view image 224 on this display device 128. When trailer 102 is not connected, the surround view image 224 provides a view of the surroundings of the vehicle 100 according to the Live View approach that includes real time movements and video of the people and objects in the surroundings of the vehicle 100.

At block 324 of the method 300, however, when the trailer 102 is connected then, the surround view camera system 104 operates to include the surroundings of the trailer 102 (in addition to the surroundings of the vehicle 100) in the surround view that is shown on the display device 128. To this end, the surround view camera system 104 determines the trailer position data 266 that corresponds to the angle 244 (FIG. 2) of the trailer 102 to the vehicle 100. As noted above, the trailer position data 266 is determined according to an image processing technique and/or using the perception sensor system 126 including the imaging device 108c.

Figure 8:
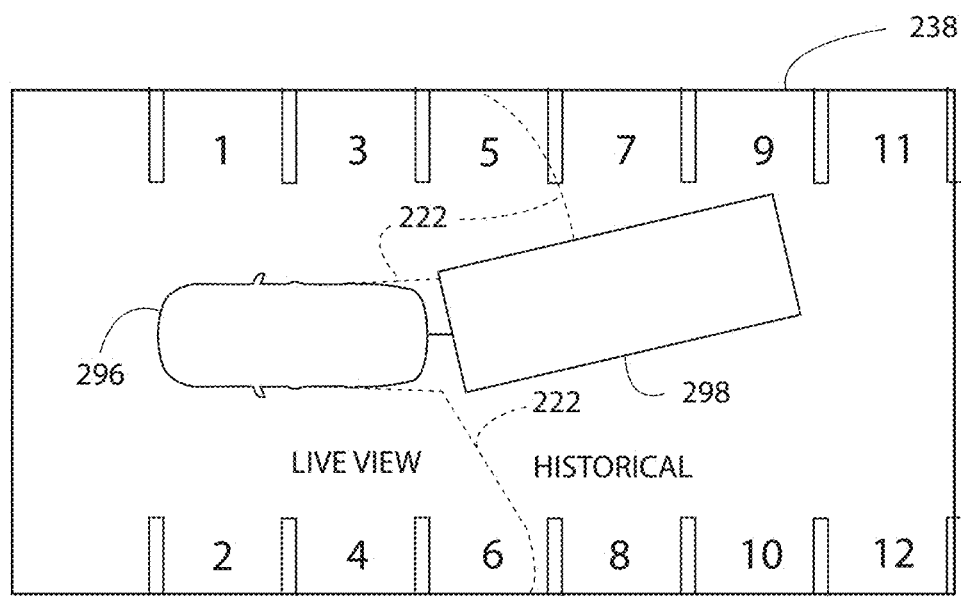
FIG. 8 is a composite surround view image that combines select portions of the surround view image and the historical surround view image of FIG. 7 in order to provide a useful surround view of the vehicle and trailer.

Next, at block 328 the surround view camera system 104 is configured to generate the historical surround view image 236 (FIG. 6) that is used to generate the composite surround view image 238 (FIG. 8). As shown in FIGS. 5 and 6, four positions of the vehicle 100 are identified as positions A, B, C, and D. The trailer 102 is included in this example, but for clarity of illustration, is not shown in FIG. 5. The "position" identifies the location of the front most portion of the vehicle 100. In this example, when the surround view image data 252 is generated, the vehicle 100 is at position D. Previously in time (i.e., at a different time) the vehicle 100 was at position C, prior to that at a different time the vehicle 100 was at position B, and prior to that at different time the vehicle 100 was at position A. The first and second image data 272, 280 used to generate the historical image data 274 of the historical surround view image 236 was generated at least at positions A, B, and C during previous times, which include a first time and a second time. The second time is after the first time, as such, the first image data 272 is referred to as being "historical," but was generated only a very short time before the generation of the second image data 280 (a few seconds to a few minutes at most).

FIG. 5 shows the field of view 218a of the front imaging device 108a at each of the four positions. The shaded portions of the fields of view 218a and the cross shaded regions therebetween represent available portions of the images 262 that are used in forming the historical surround view image 236. As shown in FIG. 6, the trailer 102 is located over portions of the historical image data 274 from at least positions A and B, when the vehicle 100 is located at position D.

The processor 116 forms the historical surround view 236 of FIG. 6 by combining and/or piecing together select or predetermined portions of the images 262. Specifically, the processor 116 uses the vehicle data 202 and/or the change data 206 to determine how far and in which direction the vehicle 100 has moved between the positions A, B, C, and D. For example, in moving from position A to position B, the vehicle 100 advanced about two meters and there was no significant change in yaw. Thus, in combining the images 262 from positions A and B, the processor 116 uses the corresponding distance data 208 and position data 216 to combine the images 262 in a manner that the objects and other elements shown in the images 262 are continuous across the combined image 236 and are the same relative size/scale in the combined image 236. The images 262 are combined by rotating and displacing the images 262 based on the change data 206 from the vehicle data 202 so that a continuous image 236 is formed. For example, the lines identifying the numbered parking spaces should be shown continuously across the combined image 236. Additionally, in moving from position B to position C, the vehicle 100 advanced three meters and there was a change in yaw as the vehicle turned to the right. Thus, in stitching together the images 262 from positions B and C, the processor 116 uses the corresponding distance data 208, position data 216, and yaw data 214 to combine the images 262 in a manner that the objects and other elements shown in the images 262 are continuous across the combined image 236 and are the same relative size/scale in the combined image 236. This process is repeated using the available historical image data 274 from the Historical View approach that was generated according to block 304.

The concept in FIG. 6 and block 328 is that by combining the images 262 based on the change data 206 and the vehicle data 202, a single larger image is formed showing the surroundings of the vehicle 100 and the trailer 102. The single larger image is the historical surround view image 236 of FIG. 6, as represented by the historical image data 274. A similar process is sometimes used to form a panoramic image from several smaller images, for example. The effect of the historical surround view image 236 is to provide an apparent top-down view of the surroundings of the vehicle 100 and the trailer 102 from the images 262 generated by a single imaging device 108a located on the front side of the vehicle 100, in this example. As described in another embodiment, the same process is used to generate the historical image data 274 using the imaging device 108e mounted on the rear side of the trailer 102 when the trailer 102 is being moved in a reverse direction by the vehicle 100.

Further at block 328, in generating the historical image surround view image 236, the processor 116 determines the location of the trailer 102 and the vehicle 100 in or relative to the historical surround view image 236 as represented in FIG. 6 by the vehicle icon 296 and the trailer icon 298. The processor 116 knows the position the vehicle 100/vehicle icon 296 based on the vehicle data 202. Additionally, the location of the vehicle 100 can be determined by processing the currently generated image data 196 and then positioning the vehicle icon 296 accordingly. The vehicle icon 296, the trailer icon 298, and corresponding positioning data, in one embodiment, are included in a position layer (also referred to as a position and size layer) that is overlaid upon the composite surround view image 238 and/or the historical surround view image 236. The position layer includes the data corresponding to the vehicle icon 296, the trailer icon 298, and the position of the trailer icon 298 relative to the vehicle icon 296 as should be shown in the surround view image 236, 238 (i.e., the trailer position data 266). Data corresponding to the position layer is stored in the memory 112. The position layer includes relevant sizing information for properly displaying the vehicle icon 296 and the trailer icon 298, as described below.

At block 328, the processor 116 determines how the trailer icon 298 should be positioned and sized relative to the vehicle 100 in the historical image data 274 based on the trailer characteristic data 278 and the trailer position data 266. The trailer characteristic data 278 is used to determine the size/scale of the trailer icon 298 to be shown on the display device 128. The trailer icon 298, the vehicle icon 296, and the image data 196 (including the historical image data 274, the surround view image data 252, and the composite surround view image data 256) are typically shown in the same scale based on at least the trailer configuration data 266. Accordingly, the processor 116 adjusts the size of the trailer icon 298 based on the trailer characteristic data 278 of the currently connected trailer 102. The processor 116 uses the trailer position data 266 from the third image data 282 to show the trailer icon 298 at the determined angle 244 with respect to the vehicle icon 296. Thus, the trailer icon 298 is positioned relative to the vehicle icon 296 in a same way that the trailer 102 is positioned relative to the vehicle 100. In another embodiment, the size and the overall appearance of the trailer icon 298 and/or the vehicle icon 296 is adjustable by the operator of the surround view camera system 104 using the input device 186.

Figure 7:
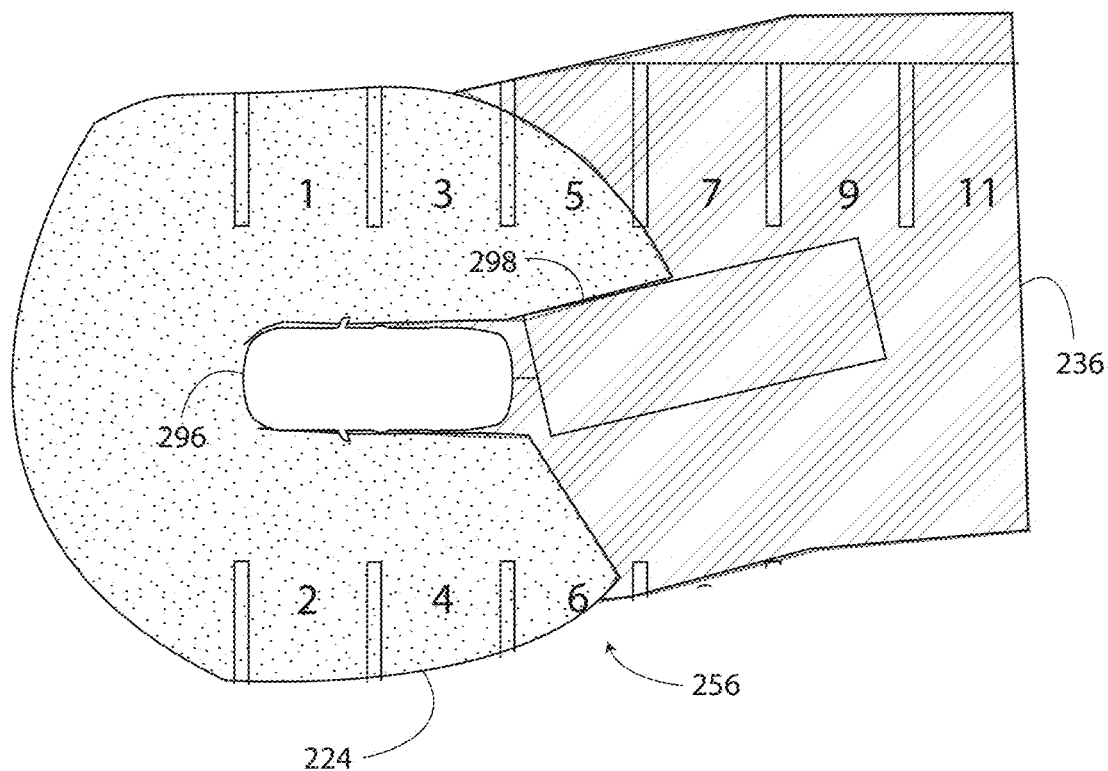
FIG. 7 is a block diagram of the parking situation of FIG. 2 showing a first area of the parking lot that is encompassed by a surround view image generated according to the Live View approach and a second area of the parking lot encompassed by a historical surround view image generated according to the Historical View approach.

Next, at block 332 and with reference to FIG. 7, the processor 116 supplements the surround view image data 252 generated according to the Live View approach with the historical image data 274 generated according to the Historical View approach to form the composite image data 256 of the composite surround view image 238. This process replaces the trailer image data 240 (FIG. 4) in the surround view image 224 with at least some of the historical image data 274.

According to an exemplary approach referred to as trailer shape detection, the processor 116 automatically identifies the trailer image data 240 (FIG. 4) in the surround view image 224 to perform the replacement of data. As noted, the trailer image data 240 is the distorted showing of the trailer 102 in the Live View surround view image 224. The trailer image data 240 is identified by processing the surround view image data 252 using image processing techniques to automatically isolate the trailer image data 240 from the rest of the surround view image data 252. The trailer image data 240 is then removed from the surround view image 224 and is replaced with the corresponding portion of the historical surround view image 236, as is shown in FIG. 7. Depending on the angle 244, the trailer image data 240 is typically a triangular or trapezoidal section of the surround view image 258 that located at a predictable location of the surround view image 224 based on the trailer characteristic data 278, for example. Depending on the embodiment, ML or CV may be used to identify the trailer image data 240.

At block 336 and with reference to FIG. 8, the composite surround view image 238 is shown on the display device 128. The composite surround view image 238 includes portions based on the Live View approach that shows a real time live view of the surroundings, and other portions based on the Historical View approach that shows a historical view of the surroundings. The lines 222 show boundaries between the two approaches. The real time live view portion based on the surround view image data 252 shows the movement of people and objects in the surroundings, but the Historical View portion based on the historical image data 274 is a static image that does not show real time movements of people and objects. The position of the trailer icon 298 and the vehicle icon 296 are updated in real time on the display device 128 as the vehicle 100 and the trailer moves 102, so that the operator of the vehicle 100 can more easily determine the location of the trailer 102 amongst the corresponding surroundings. In particular, an operator of the vehicle 100 views the composite surround view image 238 and then operates the vehicle 100 to maneuver the vehicle 100 and the trailer 102 around obstacles or a desired location, such as a selected parking spot of the numbered parking spots.

The composite surround view image 238 uses historical knowledge (i.e., the historical image data 274) from where the vehicle 100 was previously located, in order to approximate a surround view of the trailer 102 without require the imaging device 108e mounted on the trailer 102. Movement of the vehicle 100 results in real time movement of the trailer icon 298 and real time updates of the angle 244 between the icons 296, 298. Additionally, the movement results in real time updating of the portion of historical surround view image 236 on which the trailer icon 298 is overlaid so that trailer 102 can be easily maneuvered.

As noted above, when present and operably connected, according to a second embodiment the surround view camera system 104 uses the imaging device 108e (FIG. 2) mounted on the rear side of the trailer 102 to generate the historical image data 274 that is used to generate the historical surround view image 236. That is, the first and second image data 272, 280 are also generated by the imaging device 108e and the side imaging devices 108b, 108d. As set forth above, when the vehicle 100 and the trailer 102 are moving in a forward direction, the surround view camera system 104 uses the front imaging device 108a and/or the side imaging devices 108b, 108d on the vehicle 100 to generate the historical image data 274. When, however, the vehicle 100 and the trailer 102 are moving in a reverse direction, then the surround view camera system 104 generates the historical image data 274 using the imaging device 108e mounted on the rear side of the trailer 102 and/or the side imaging devices 108b, 108d mounted on the vehicle. The image data 196 from the side imaging devices 108b, 108d is combined with the image data 196 from the trailer imaging device 108e during turning of the vehicle 100 and the trailer 102. The processor 116 combines the images 262 generated by the imaging device 108e in the same manner as set forth above to arrive at the historical surround view image 236 shown in FIG. 10. That is, the same method 300 is used to generate the composite surround view image 238 based on the images 262 from the imaging device 108e mounted on the trailer 102. Specifically, the processor 116 uses the change data 206, as determined from the vehicle data 202, and the trailer position data 266, as determined from the third image data 282, to rotate and to displace the images 262 until a combined continuous image 236 is formed.

Figure 9:
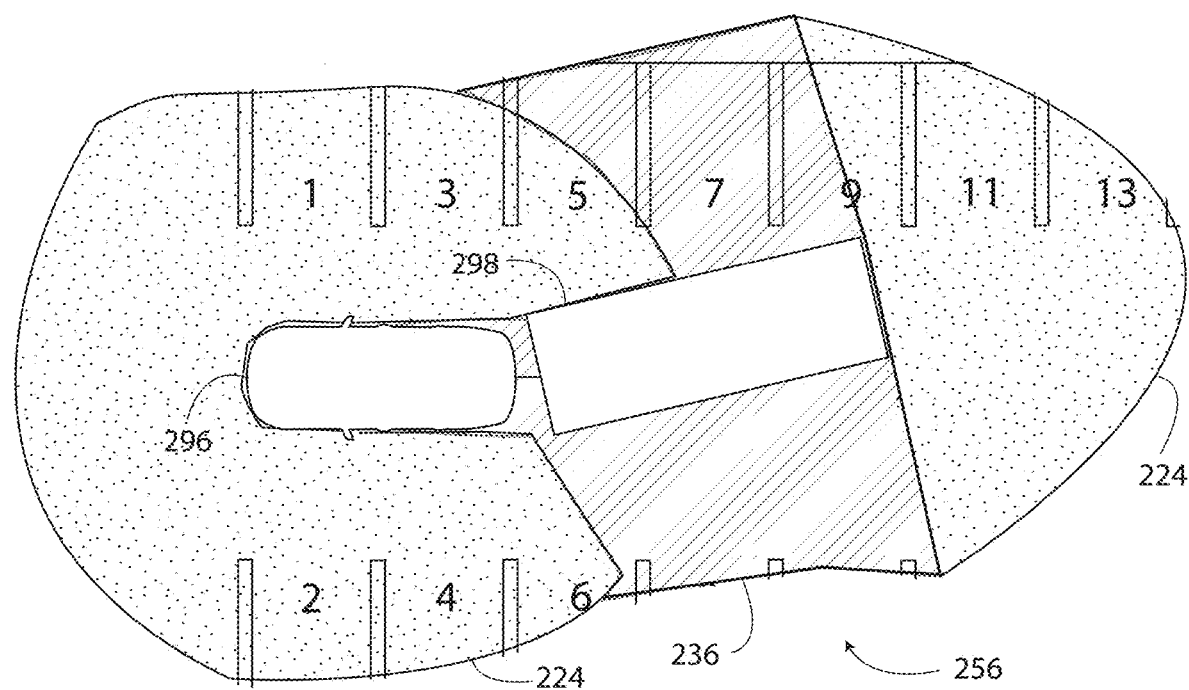
FIG. 9 is a block diagram of the parking situation of FIG. 2 a first area of the parking lot that is encompassed by a first surround view image generated according to the Live View approach, a second area of the parking lot encompassed by a historical surround view image generated according to the Historical View approach, and a third area of the parking lot that is encompassed by a second surround view image generated according to the Live View approach.
Figure 10:
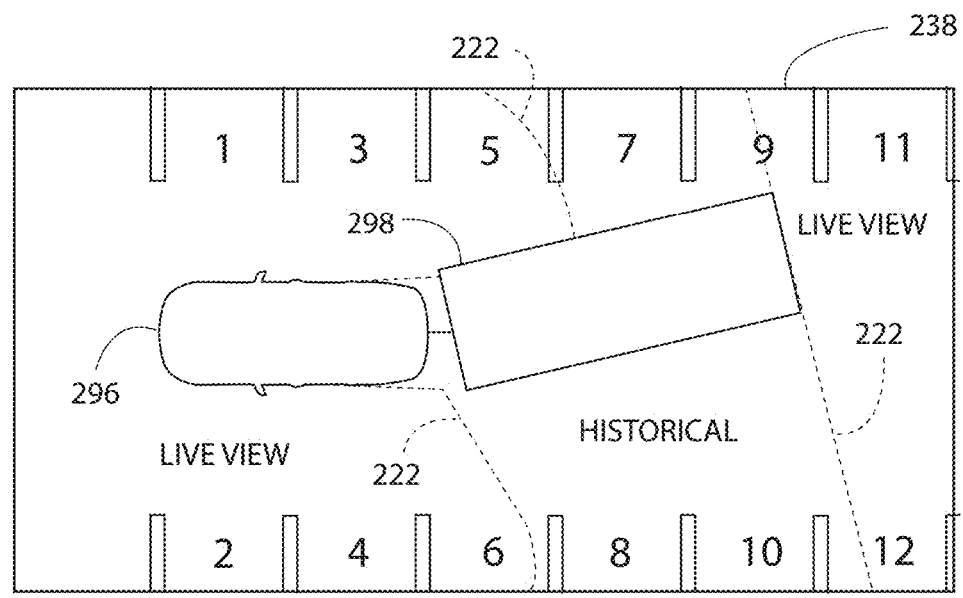
FIG. 10 is another composite surround view image that combines select portions of the surround view images and the historical surround view image of FIG. 9 in order to provide a useful surround view of the vehicle and trailer.

FIGS. 9 and 10 illustrate an example of this approach. As shown in FIG. 9, the composite image data 256 is divided into three sections instead of two sections in FIG. 7. The three sections include Live View portion on the sides and the front of the vehicle 100, a Historical View portion on the sides of the trailer 102, and another Live View portion at the rear of the trailer 102. In FIG. 9, the historical image data 274 was generated by driving the vehicle 100 in reverse to move the trailer 102 toward parking spaces 11 and 13. According to this approach less "artificial" data from the historical image data 274 is used, because there are more imaging devices 108a, 108b, 108c, 108d, 108e available to provide a meaningful live view of the surroundings. The historical image data 274 fills in the gaps between the two Live View sections. In FIG. 10, the dashed lines 222 show the boundaries between the different sources of data.

In an embodiment of the surround view camera system 104 including the imaging device 108e on the rear side of the trailer 102, the processor 116 selectively switches between generating the historical image data 274 using (i) the imaging device 108a mounted on the front of vehicle 100 when the vehicle 100 and the trailer 102 are moving forward, and (ii) the imaging device 108e mounted on the rear side of the trailer 102 when the vehicle 100 and the trailer 102 are moving backward. This approach generates the composite surround view image 238 with as much of the surround view data 252 from the Live View approach as is available, and fills in any gaps with the historical image data 274 of the Historical View approach.

The surround view camera system 104 is configured to show the trailer icon 298 in several different styles, as desired by the operator. For example, the trailer icon 298 is opaque and includes a filled-in rectangle, for example, such that the historical surround view image 236 does not show through the trailer icon 298. In another embodiment, the trailer icon 298 is "transparent" and includes an outline of a rectangle (representing the trailer 102) with no "fill," such that the historical surround view image 236 shows through the trailer icon 298 on the display device 128. This approach is referred to as a transparent trailer view and enables the operator of the vehicle 100 "see underneath" the trailer 102 when viewing the composite surround view image 238, as may be useful in navigating the trailer 102 over speed bumps, potholes, and other ground surface obstructions in the parking lot. In yet another embodiment, the trailer icon 298 is removed from the composite surround view image 238 and the position layer to provide an "invisible" trailer view. This is referred to as a composite surround view image 238 including an invisible trailer view of the surroundings of the vehicle 100 and/or the trailer 102. Additionally or alternatively, the trailer icon 298 is selected to match or correspond to a top view of the trailer 102. The trailer icon 298 is saved as a .jpg in the memory 112 or has any other corresponding file type. The trailer icon 298 is selected by an operator of the surround view camera system 104 using the input device 186, for example.

With reference again to FIG. 4, in another embodiment, the surround view camera system 104 does not use trailer shape detection to remove the trailer data 240 from the surround view image data 252. Trailer shape detection can be an intensive operation on the processor 116. As such, in another embodiment, instead of using trailer shape detection, the surround view camera system 104 eliminates all of the surround view image data 252 located on a trailer 102 side of a cutoff line 254 (FIG. 4). The surround view image data 252 located on a vehicle 100 of the cutoff line 254 is kept. The cutoff line 254 is perpendicular to the longitudinal axis 226 of the vehicle 100. In one embodiment, the cutoff line 254 is behind the rear imaging device 108c so that some of the image data 196 generated by the imaging device 108c is retained in the surround view image data 252.

In one embodiment, before performing the method 300, the surround view camera system 104 is calibrated. Calibrating the surround view camera system 104 includes making adjustments so that the images 258 generated by the imaging devices 108a, 108b, 108c, 108d, 108e are stitched and/or blended together correctly. Correctly stitching and/or blending together the images 258 includes combining the images 258 so that the features of the images 258 are shown in alignment and at the same scale in the surround view image 224, for example. Additionally, the calibration process includes determining or inputting a size and shape of a field of view 218e of at least the imaging device 108e mounted on the trailer 102. The imaging device 108e is typically an aftermarket accessory to the vehicle 100 and, therefore, the vehicle 100 must be calibrated or configured for integration of the imaging device 108e into the surround view camera system 104.

Moreover, the method 300 may further include at blocks 312 and 328 additional image processing in order to dewarp the images 258, 262, when appropriate. Dewarping refers to reducing and/or eliminating distortion of an image caused by structural characteristics (intrinsic and extrinsic) of the lens of the imaging device 108a, 108b, 108c, 108d, 108e. Dewarping is also referred to as rectifying the images 258, 262. Typically, dewarping is utilized when the imaging device 108a, 108b, 108c, 108d, 108e includes a fisheye lens, and is also referred to as fisheye dewarping. In one embodiment, the processor 116 is configured to process the image data 196 to perform the dewarping. In another embodiment, the imaging devices 108a, 108b, 108c, 108d, 108e have corresponding processors (not shown) that perform an "on-device" dewarping of the image data 196 before the image data 196 is transmitted to the processor 116. The dewarped images are perspective corrected versions of the images generated by the imaging devices 108a, 108b, 108c, 108d, 108e. The processor 116 uses the fields of view 218a, 218b, 218c, 218d of the imaging devices 108a, 108b, 108c, 108d and the field of view 218e of the imaging device 108e to dewarp the image data 196. The size and shape of the fields of view 218a, 218b, 218c, 218d, 218e may be automatically determined or provided by the operator using the input. Additional intrinsic data and/or extrinsic camera data pertaining to the imaging devices 108a, 108b, 108c, 108d, 108e may also be used in the dewarping process. Intrinsic camera data includes the fields of view 218a, 218b, 218c, 218d, 218e and known distortion parameters. Extrinsic camera data includes position and angle data of the imaging devices 108a, 108b, 108c, 108d, 108e relative to the vehicle 100, the trailer 102, and/or each other imaging device 108a, 108b, 108c, 108d, 108e.

In another embodiment, a further method of operating the surround view camera system 104 includes the following approach. To begin, the processor 116 determines if the imaging devices 108a, 108b, 108c, 108d are connected thereto, and are operating to generate the image data 196. If the imaging devices 108a, 108b, 108c, 108d are not connected or are not generating the image data 196, then the surround view image 224 is not generated by the surround view camera system 104. If the imaging devices 108a, 108b, 108c, 108d are connected and are generating the image data 196, then the method proceeds.

Next, the method includes determining if the trailer 102 is connected to the vehicle 100, according to the above-described approach at block 302, for example. When the trailer 102 is not connected to the vehicle 100, the surround view camera system 104 generates the surround view image 224 without compensating for a connected trailer 102.

When it is determined that the trailer 102 is connected to the vehicle 100, the method proceeds to determine if the surround view camera system 104 is calibrated properly for compensating for the change to the surround view image 224 caused by the distorted showing of the connected trailer 102. This approach includes determining if the trailer 102 is a recognized trailer for which the trailer characteristic data 278 is known. When trailer 102 is recognized, the trailer characteristic data 278 is retrieved from the memory 112. The approach also includes, if required, receiving input data corresponding to the trailer characteristic data 278, such as when an operator uses the input device 186 to manually provide the trailer characteristic data 278. The approach further includes, if required, determining at least some of the trailer characteristic data 278 using the perception sensor system 126, which includes, among other sensors, the imaging devices 108a, 108b, 108c, 108d and imaging device 108e, if equipped and connected.

Next, with the trailer 102 connected to the vehicle 100, the method includes determining if (i) the surround view camera system 104 is calibrated for determining the T2V angle 244, (ii) additional calibration is required, or (iii) faults are present. When surround view camera system 104 is uncalibrated and/or faults are identified, the method may be halted or the surround view camera system 104 may revert to generating the surround view image 224 without compensating for the connected trailer 102. Additionally or alternatively, a message may be displayed on the display 128 to inform the operator of the vehicle 100 that the surround view camera system 104 has faulted or needs calibration.

Next, the method includes continuously generating and buffering images (i.e. continuously generating the image data 196) from the imaging devices 108a, 108b, 108c, 108d according to the Live View approach. Moreover, the processor 116 continuously determines the angle 244 and maps the determined angle 244 to the continuously generated and buffered images of the image data 196.

The method next includes determining if the speed of the vehicle 100 is below the threshold speed (i.e., the predetermined speed) and if an operator of the vehicle 100 has selected for the composite surround view image 238 to be generated, such as by using the input device 186. In response, the composite surround view image 238 is generated based on the Live View approach and the Historical View approach, according to the moving direction of the vehicle (forward or reverse). Moreover, when the imaging device 108e mounted on the trailer 102 is present, the method incorporates the corresponding image data 196, as is shown in FIG. 10. The composite surround view image 238 is displayed on the display device 128 so that the operator can more easily operate the vehicle 100.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a surround view camera system for a vehicle towing a trailer, the method comprising:
generating first image data at a first time using a first imaging device operably connected to a front side of the vehicle or a rear side of the trailer;
generating second image data at a second time using the first imaging device, the second time different from the first time;

generating third image data using a second imaging device operably connected to a rear side of the vehicle;
receiving vehicle data with a processor as generated by at least one vehicle sensor, the vehicle data corresponding to movement of the vehicle from the first time to the second time, the processor operably connected to the first imaging device, the second imaging device, and the third imaging device to receive the generated first image data, the second image data, and the third image data;
processing the third image data to determine trailer position data corresponding to a position of the trailer relative to the vehicle at the first and second times;
generating historical surround view image data using the processor by combining the first image data and the second image data based on the vehicle data and/or the trailer position data, the historical surround view image data corresponding to at least a historical surround view image of the surroundings of the trailer; and
operating the vehicle to maneuver the trailer based on the historical surround view image.

2. The method as claimed in claim 1, further comprising:
overlaying a position layer on the historical surround view image based on the trailer position data, the position layer including a vehicle icon corresponding to a top view of the vehicle and a trailer icon corresponding to a top view of the trailer,
wherein the trailer icon is positioned relative to the vehicle icon in a same way that the trailer is positioned relative to the vehicle.

3. The method as claimed in claim 2, further comprising:
removing the trailer icon from the position layer, such that the historical surround view image does not include the trailer icon and provides an invisible trailer view of the surroundings of the trailer.

4. The method as claimed in claim 2, wherein the trailer icon includes an outline of the trailer and is transparent, such that portions of the historical surround view image show through the trailer icon corresponding to a ground surface over which the trailer is positioned.

5. The method as claimed in claim 1, further comprising:
generating the first image data and the second image data using the first imaging device when the first imaging device is mounted on the front side of the vehicle and the vehicle is moving in a forward direction,
wherein generating the historical surround view image data includes rotating a first image corresponding to the first image data relative to a second image corresponding to the second image data based on the vehicle data.

6. The method as claimed in claim 1, further comprising:
generating the first image data and the second image data using the first imaging device when the first imaging device is mounted on the rear side of the trailer and the vehicle is moving in a reverse direction,
wherein generating the historical surround view image data includes rotating a first image corresponding to the first image data relative to a second image corresponding to the second image data based on the vehicle data and the trailer position data.

7. The method as claimed in claim 1, wherein:
the vehicle defines a vehicle longitudinal axis,
the trailer defines a trailer longitudinal axis, and
the trailer position data includes an angle of the vehicle longitudinal axis to the trailer longitudinal axis.

8. The method as claimed in claim 2, wherein:
trailer characteristic data includes at least one of a length of the trailer, a width of the trailer, and a height of the trailer,
the trailer icon, the vehicle icon, and the historical surround view image are shown at the same scale on a display device based on the trailer characteristic data, and
wherein the trailer characteristic data is determined using at least one of machine learning, computer vison, a LIDAR system of the vehicle, a radar system of the vehicle, and/or an ultrasonic sensor system of the vehicle.

9. The method as claimed in claim 1, further comprising:
generating fourth image data using a third imaging device operably connected to a left side of the vehicle, the third imaging device operably connected to the processor;
generating fifth image data using a fourth imaging device operably connected to a right side of the vehicle, the fourth imaging device operably connected to the processor;
generating surround view image data based on at least the third image data, the fourth image data, and the fifth image data corresponding to a real time surround view image of the surroundings of the vehicle;
processing the surround view image data to identify trailer image data corresponding to a showing of the trailer in the surround view image;
replacing the trailer image data with at least a portion of the historical surround view image data to generate composite surround view data corresponding to a composite surround view image; and
overlaying a position layer on the composite surround view image based on the trailer position data, the position layer including a vehicle icon corresponding to a top view of the vehicle and a trailer icon corresponding to a top view of the trailer.

10. The method as claimed in claim 9, wherein:
the trailer icon is positioned over at least a portion of the historical surround view image,
the vehicle icon is positioned over at least a portion of the real time surround view image, and
the trailer icon is positioned relative to the vehicle icon in a same way that the trailer is positioned relative to the vehicle based on the trailer position data.

11. A surround view camera system for a vehicle towing a trailer, comprising:
a first imaging device mounted to a front side of the vehicle or a rear side of the trailer and configured (i) to generate first image data at a first time, and (ii) to generate second image data at a second time, the second time different from the first time;
a second imaging device mounted to a rear side of the vehicle and configured to generate third image data;
at least one vehicle sensor mounted on the vehicle and configured to generate vehicle data corresponding to movement of the vehicle from the first time to the second time;
a processor operably connected to the first imaging device, the second imaging device, the third imaging device, and the at least one vehicle sensor, the processor configured to:
receive the first image data, the second image data, the third image data, and the vehicle data, process the third image data to determine trailer position data corresponding to a position of the trailer relative to the vehicle at the first and second times;

generate historical surround view image data by combining the first image data and the second image data based on the vehicle data and/or the trailer position data, the historical surround view image data corresponding to at least a historical surround view image of the surroundings of the trailer, wherein the vehicle is operated to maneuver the trailer based on the historical surround view image.

12. The surround view camera system as claimed in claim 11, wherein:

the processor is further configured to overlay a position layer on the historical surround view image based on the trailer position data, the position layer including a vehicle icon corresponding to a top view of the vehicle and a trailer icon corresponding to a top view of the trailer, and the trailer icon is positioned relative to the vehicle icon in a same way that the trailer is positioned relative to the vehicle.

13. The surround view camera system as claimed in claim 12, wherein the processor is further configured to remove the trailer icon from the position layer, such that the historical surround view image does not include the trailer icon and provides an invisible trailer view of the surroundings of the trailer.

14. The surround view camera system as claimed in claim 12, wherein the trailer icon includes an outline of the trailer and is transparent, such that portions of the historical surround view image show through the trailer icon corresponding to a ground surface over which the trailer is positioned.

15. The surround view camera system as claimed in claim 11, wherein the processor is further configured to:

generate the first image data and the second image data using the first imaging device when the first imaging device is mounted on the front side of the vehicle and the vehicle is moving in a forward direction, and generate the historical surround view image data by rotating a first image corresponding to the first image data relative to a second image corresponding to the second image data based on the vehicle data.

16. The surround view camera system as claimed in claim 11, wherein the processor is further configured to:

generate the first image data and the second image data using the first imaging device when the first imaging device is mounted on the rear side of the trailer and the vehicle is moving in a reverse direction, and generate the historical surround view image data by rotating a first image corresponding to the first image data relative to a second image corresponding to the second image data based on the vehicle data and the trailer position data.

17. The surround view camera system as claimed in claim 11, wherein:

the vehicle defines a vehicle longitudinal axis, the trailer defines a trailer longitudinal axis, and the trailer position is an angle of the vehicle longitudinal axis to the trailer longitudinal axis.

18. The surround view camera system as claimed in claim 11, wherein:

the trailer characteristic data includes at least one of a length of the trailer, a width of the trailer, and a height of the trailer, the trailer icon, the vehicle icon, and the historical surround view image are shown at the same scale on a display device based on the trailer characteristic data, and the trailer characteristic data is determined using at least one of machine learning, computer vison, a LIDAR system of the vehicle, a radar system of the vehicle, and/or an ultrasonic sensor system of the vehicle.

19. The surround view camera system as claimed in claim 11, further comprising:

a third imaging device operably connected to the processor and configured to generate fourth image data, the third imaging device mounted on a left side of the vehicle;

a fourth imaging device operably connected to the processor and configured to generate fifth image data, the fourth imaging device mounted on a right side of the vehicle;

wherein the processor is further configured to:

generate surround view image data based on at least the third image data, the fourth image data, and the fifth image data corresponding to a real time surround view image of the surroundings of the vehicle;

process the surround view image data to identify trailer image data corresponding to a showing of the trailer in the surround view image;

replace the trailer image data with at least a portion of the historical surround view image data to generate composite surround view data corresponding to a composite surround view image; and overlay a position layer on the composite surround view image based on the trailer position data, the position layer including a vehicle icon corresponding to a top view of the vehicle and a trailer icon corresponding to a top view of the trailer.

20. The surround view camera system as claimed in claim 19, wherein:

the trailer icon is positioned over at least a portion of the historical surround view image, the vehicle icon is positioned over at least a portion of the real time surround view image, and the trailer icon is positioned relative to the vehicle icon in a same way that the trailer is positioned relative to the vehicle based on the trailer position data.

* * * * *